US008254328B2

(12) United States Patent
Yoshida et al.

(10) Patent No.: US 8,254,328 B2
(45) Date of Patent: Aug. 28, 2012

(54) SCHEDULING METHOD FOR MULTI-USER MIMO IN WHICH RESOURCE BLOCKS ARE ALLOCATED BASED ON PRIORITIES

(75) Inventors: Shousei Yoshida, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 833 days.

(21) Appl. No.: 12/332,480

(22) Filed: Dec. 11, 2008

(65) Prior Publication Data

US 2009/0154419 A1    Jun. 18, 2009

(30) Foreign Application Priority Data

Dec. 17, 2007 (JP) .................................. 2007-325329
Mar. 4, 2008 (JP) .................................. 2008-053048

(51) Int. Cl.
*H04W 4/00* (2009.01)
(52) U.S. Cl. ....................................................... 370/330
(58) Field of Classification Search .................. 370/310, 370/319, 321, 326, 332, 314, 329, 330, 335, 370/336, 343, 342, 478, 465
See application file for complete search history.

(56) References Cited

U.S. PATENT DOCUMENTS

| 2003/0165123 | A1* | 9/2003 | Saunders et al. | 370/329 |
| 2007/0058583 | A1* | 3/2007 | Cho et al. | 370/329 |
| 2008/0013610 | A1* | 1/2008 | Varadarajan et al. | 375/221 |

FOREIGN PATENT DOCUMENTS

| JP | 2007214993 A | 8/2007 |
| JP | 2007221755 A | 8/2007 |

OTHER PUBLICATIONS

Zhenya Tu et al., "Multiuser Diversity for a Dirty Paper Approach", IEEE Communications Letters, vol. 7, No. 8, Aug. 2003, pp. 370-372.
Taesang Yoo et al, "On the Optimality of Mutlianntenna Broadcast Scheduling Using Zero-Forcing Beamforming", IEE Journal of Selected Areas in Communications, vol. 24, No. 3, Mar. 2006, pp. 528-541.

* cited by examiner

*Primary Examiner* — Kwang B Yao
*Assistant Examiner* — Anh Ngoc Nguyen

(57) ABSTRACT

A priority computation process computes a priority of each user for each RB (Resource Brock) using a reception SINR. A maximum priority user selection/RB allocation process selects a user with the maximum priority for an unallocated RB and allocates the RB to the user. A frequency axis/space axis unallocated RB presence determination process proceeds to scheduling for a next user if there is an unallocated RB on the frequency or space axis. A projected channel vector update process updates a projected channel vector of an unselected user by GS orthogonalization. An orthogonal coefficient computation process computes an orthogonal coefficient. A corrected SINR computation process computes a corrected SINR. A next MIMO layer priority computation process computes priorities of unselected users for a corresponding RB in the next multiple MIMO layer. The priorities of the unselected users are used in the next user scheduling processing.

19 Claims, 11 Drawing Sheets

SCHEDULING METHOD FOR MULTI-USER MIMO IN WHICH RESOURCE BLOCKS ARE ALLOCATED BASED ON PRIORITIES

This application is based upon and claims the benefit of priority from Japanese Patent Application No. 2008-053048 filed Mar. 4, 2008 and Japanese Patent Application No. 2007-325329 filed Dec. 17, 2007, the disclosures of which are incorporated herein in their entirety by reference.

BACKGROUND OF THE INVENTION

1. Field of the Invention

The present invention relates to a multi-user MIMO scheduling method, and particularly to a scheduling method for allocating resource blocks generated by frequency division within a system band to an optimal user in consideration of reception quality in the frequency axis and the space axis.

2. Description of Related Art

Multi User-Multiple Input Multiple Output (hereafter, shortly referred to as MU-MIMO) is a promising communication technology for improving the cell throughput in uplink wireless access of next-generation mobile communication systems. In the MU-MIMO communication, a plurality of terminals transmit data signals with the same frequency, and a base station divides signals transmitted by a plurality of users (mobile stations or transmission devices) while considering as MIMO signals. The MU-MIMO communication system is believed to be a space division multiple access (hereafter, shortly referred to as SDMA) system using spatial channels as resources, in addition to generally used time and frequency resources. The use of SDMA makes it possible to obtain a significant multi-user diversity effect by appropriately selecting a user pair simultaneously transmitting data, and thus to improve the cell throughput of mobile communication systems.

FIG. 1 shows configuration of an uplink MU-MIMO communication system. It is assumed here that each of users' transmission devices (mobile stations or communication terminals) 301-1 to 301-M (M is a positive integer) has a single transmission antenna. However, there may be a case in which each of users' transmission devices has a plurality of transmission antennas, and data is transmitted by selecting one of the transmission antennas, or data is transmitted using the plurality of transmission antennas. When a number of simultaneously transmitting users is represented by M, each of the transmission devices 301-1 to 301-M of the users converts a data signal into an error correcting code and digital modulates the same. Each of data signals of each of the users is transmitted from each of the transmission antennas 302-1 to 302-M of the users. Reception antennas 303-1 to 303-N (N is a positive integer) receive multiplexed data signals from the users. A reception device (base station) 304 divides and demodulates the data signals from the users to decode the error correcting codes. The reception device 304 selects a user pair transmitting data simultaneously for each packet based on measurement results of channel quality of the users. A reception signal y received by the reception device 304 is represented by the following expression (3) using the following expression (1) indicating transmission symbols of the paired users $J_1$ to $J_M$ and the expression (2) indicating a channel matrix.

$$S_k = [S_{J_1} \ S_{J_2} \ldots S_{J_M}]^T \quad (1)$$

$$H_k = [h_{J_1} \ h_{J_2} \ldots h_{J_M}] \quad (2)$$

$$y = H_k S_k + n \quad (3)$$

In the expression (3) above, n represents a noise vector.

In case of MU-MIMO, a user pair must be selected in consideration of channel orthogonality of the user pair, and a full search method may be used for realizing optimal characteristics. In the full search method, combined MIMO capacities of all the users are computed, and a user pair whose capacity is maximal is selected. When a channel matrix in a user combination k (k=1, 2, ... $N_{all}$) is represented by $H_k$, the MIMO capacity can be represented by the following expression (4).

$$C(H_k) = \log_2 \det\left(I + \frac{P_s}{P_n} H_k H_k^H\right) \approx M \log_2 \frac{P_s}{P_n} + \log_2 \det(H_k H_k^H) \quad (4)$$

In the expression (4) above, $P_S$ represents transmission power per user, and $P_n$ represents noise power. In the full search method, a user combination $k_{opt}$ whose MIMO capacity $C(H_k)$ is maximal is selected. $k_{opt}$ can be represented by the following expression (5).

$$k_{opt} = \underset{k}{\mathrm{argmax}}\, C(H_k) \quad (5)$$

According to a user selection method using the full search method, computation must be done on a number of MIMO capacities $C(H_k)$ which corresponds to the number of combinations $N_{all}$ of all the users ($N_{all} = {}_{N_u}C_M$), and thus the amount of computation becomes enormous when the number of users $N_u$ and/or the number of simultaneously transmitting users M is great.

In order to reduce the amount of computation in the full search method, a method has been proposed in which users are selected by employing a Gram-Schmitd (hereafter, referred to as GS in abbreviation) orthogonalization to conduct sequential processing on each of multiple MIMO layers [see, for example, Z. Tu and R. S. Blum, "Multiuser diversity for a dirty paper approach," IEEE Commun. Lett., vol. 7, no. 8, pp. 370-372, August 2003 (Non-Patent Document 1) and T. Yoo and A. Goldsmith, "On the optimality of multiantenna broadcast scheduling using zero-forcing beam forming," IEEE J. Select. Areas Commun., vol. 24, no. 3, pp. 528-541, March 2006 (Non-Patent Document 2)]. The term "multiple MIMO layers (MIMO layers)" as used herein refers to transmitted data signals which have been independently converted into error correcting codes and modulated in MIMO multiplexing.

A description will be made on a principle of the MU-MIMO user selection method using GS orthogonalization. When QR decomposition ($H_k = Q_k R_k$) is applied to a channel matrix $H_k$, a user combination $k_{opt}$ whose MIMO capacity is maximal is represented by the following expression (6).

$$k_{opt} = \underset{k}{\mathrm{argmax}}\,|\det(R_k)|^2 = \underset{k}{\mathrm{argmax}} \prod_{m=1}^{M} r_{k,mm}^2 \quad (6)$$

In the expression (6) above, $r_{k,mm}$ represents a diagonal element of $R_k$. The MIMO capacity can be maximized by selecting users such that the square of $r_{k,mm}$ is maximal. The GS orthogonalization is employed in order to realize this suboptimally. The GS orthogonalization corresponds to a process to perform QR decomposition while sequentially selecting users such that $r_{k,mm}$ is maximal.

FIG. 2 shows relationship between the GS orthogonalization and the QR decomposition. The GS orthogonalization (QR decomposition) processing ends upon selection of the M-th user from $N_u$ users.

FIG. 3 shows a concept of the GS orthogonalization. The GS orthogonalization repeats a process in which a user whose channel vector $h_j$ can be projected as large as possible and an orthogonal axis corresponding thereto are successively selected while, at the same time, updating the projected channel vector $h_j^{(m+1)}$ of $h_j$ projected on a complementary space $Q^{(m)\perp}$ of an orthonormal system $Q^{(m)}$ composed of m orthogonal axes of already selected users.

FIG. 4 shows a user selection (scheduling) method using GS orthogonalization as an example of MU-MIMO scheduling methods. This scheduling method includes a channel vector measurement process 101, a channel power computation process 102, a maximum power user selection process 103, a projected channel power computation execution determination process 104, a projected channel vector update process 105, and a projected channel power computation process 106. This scheduling method computes power values (or amplitude values) of projected channel vectors of the users using the GS orthogonalization to select a maximum power user for each of the multiple MIMO layers.

The channel vector measurement process 101 measures an uplink channel vector with the use of a reference signal for each user (a sounding reference signal periodically transmitted principally when no data is transmitted). The channel power computation process 102 computes a channel power based on the channel vector of each user. The maximum power user selection process 103 selects a user whose projected channel power is maximal for each of the multiple MIMO layers. The user $J_m$ selected for the m-th multiple MIMO layer is represented by the following expression (7).

$$J_m = \operatorname*{argmax}_j \|h_j^{(m)}\|^2 \quad (7)$$

In the expression (7) above, $h_j^{(1)}=h_j$ when m=1. The projected channel power computation execution determination process 104 proceeds to the projected channel power computation process for the next multiple MIMO layer if m<M, whereas, if m=M, terminates the user selection (scheduling) and outputs user selection information.

The projected channel vector update process 105 updates, by GS orthogonalization, a projected channel vector $h_j^{(m+1)}$ of an unselected user which is projected on a complementary space $Q^{(m)\perp}$ of an orthonormal system $Q^{(m)}$ corresponding to a user already selected. The projected channel vector $h_j^{(m+1)}$ is represented by the following expression (8).

$$h_j^{(m+1)} = h_j^{(m)} - \frac{\left(h_{J_m}^{(m)H} h_j^{(m)}\right) h_{J_m}^{(m)}}{\|h_{J_m}^{(m)}\|^2} \quad (8)$$

The projected channel power computation process 106 computes a power of the projected channel vector $h_j^{(m+1)}$ updated by GS orthogonalization. The projected channel power of the unselected user is input to the maximum power user selection process 103 so that a user for the next multiple MIMO layer is selected.

On the other hand, Single Carrier-Frequency Division Multiple Access (hereafter, referred to as SC-FDMA) or Orthogonal Frequency Division Multiple Access (hereafter, referred to as OFDMA) is employed for uplink wireless access in next-generation mobile communication systems. According to these FDMA methods, a wireless resource is frequency-divided into a plurality of resource blocks (hereafter, referred to as RB) within a system band. A plurality of RBs may be combined to form a carrier in order to increase the communication capacity. The frequency-divided RBs are allocated to a plurality of users. Among scheduling methods for allocating RBs to a plurality of users, a frequency scheduling method for allocating RBs to a user with the maximum priority in accordance with channel variation along the frequency axis is particularly effective in improving the throughput.

A communication system described in Japanese Laid-Open Patent Publication No. 2007-214993 (Patent Document 1) is one of known technologies for improving the throughput by manipulating the scheduling. According to Patent Document 1, a terminal-station apparatus waiting to commence communication autonomously requests a base station for spatial multiplex scheduling if a desired transmission rate can be satisfied by itself. Thus, this technique intends to improve the throughput and to reduce the load of computation of the base station by performing efficient scheduling by utilizing the request for scheduling from the terminal-station apparatus to the base station. Base stations in general are provided with a scheduler function by cooperation between software and hardware. The scheduler function is described also in Japanese Laid-Open Patent Publication No. 2007-221755 (Patent Document 2), for example. Although Patent Document 2 describes a scheduler (scheduling unit) for use in MU-MIMO, it does not mention at all a scheduling method which constitutes a principal operation of the scheduler.

FIG. 5 schematically shows frequency scheduling using a maximum CIR method. In the frequency scheduling, reception SINRs (Signal to Interference and Noise power Ratios) of users are measured for each RB so that RBs are allocated to a user with a maximum reception SINR. In the example shown in FIG. 5, RB2 and RB3 are allocated to the user #1, RB1 to the user #2, and RB4 to the user #3.

FIG. 6 shows a frequency scheduling method. This scheduling method includes a reception SINR measurement process 201 for each RB, a priority computation process 202 for each RB, a maximum priority user selection/RB allocation process 203, allocation of plural RBs 204, and determination of presence of unallocated RB on frequency axis 205.

The reception SINR measurement process 201 measures uplink reception SINRs for each RB with the use of reference signals of the users. A reception SINR is generally used as an indicator indicative of a channel quality, or CQI (Channel Quality Indicator) in mobile communication systems. Therefore, CQI may be used as the reception SINR. The priority computation process 202 computes priorities of users for each RB using the reception SINRs, based on a maximum CIR method or Proportional Fairness (PF) method. The maximum priority user selection/RB allocation process 203 selects a user with maximum priority for an unallocated RB so that the RB is allocated to the user. If the user allocated with an RB in the maximum priority user selection/RB allocation process 203 has still other RBs for which it has maximum priority, the plural RBs allocation process 204 allocates those RBs to the user. In the SC-FDMA method which requires allocation of consecutive RBs, for example, if the user has the maximum priority for RBs adjacent to the allocated RB, these RBs are allocated to the user. The frequency axis unallocated RB presence determination process 205 proceeds to scheduling for a next user if there is an unallocated RB along the frequency axis, whereas terminates the scheduling if there is no unallocated RB and outputs user selection and RB allocation information.

SUMMARY

The MU-MIMO scheduling methods described above provide scheduling only in the space axis direction (multiple MIMO layers), while assuming a single carrier on the frequency axis. Moreover, the signal power criteria are based on projected channel power of each user, while no consideration is given to interference power. It is believed that when performing frequency scheduling in MU-MIMO systems, interference power will differ for each RB depending on communication circumstances of other cells. Therefore, it is desirable that the interference power is taken into consideration in scheduling methods.

Further, the MU-MIMO scheduling methods described above provide scheduling on the basis of the maximum MIMO capacity, in other words, using a Channel Aware (CA) method. The prior art documents do not mention at all applications to a scheduling method using a PF method, or a scheduling method taking into consideration other factors than the channel quality, such as priority of a request for delay or a request for retransmission. Although the CA method corresponds to a conventional maximum CIR method, it is referred to as the CA method here since the MU-MIMO considers not only CIR but also channel orthogonality.

The present invention provides an MU-MIMO scheduling method conforming to a known frequency scheduling method using reception SINRs. In the MU-MIMO scheduling method, RBs generated by frequency division within a system band are allocated to optimal users while considering reception qualities (SINRs) represented in two dimensions of the frequency axis and the space axis.

The MU-MIMO scheduling method according to an aspect of the present invention is an MU-MIMO scheduling method for allocating frequency- and space-divided RBs to users.

According to the MU-MIMO scheduling method, RB allocation to an n-th user is performed such that one or more RBs are allocated to a user with the maximum priority determined based on reception SINRs for each RB (the first multiple MIMO layer) or corrected SINRs (the second and onward multiple MIMO layers). Then, a corrected SINR of an unselected user for RBs in the multiple MIMO layer next to the allocated RBs is computed. Subsequently, a priority represented by a function of the corrected SINR is computed and RBs are allocated to an (n+1)-th user based on priorities of unallocated RBs including those for which the priority has been computed.

The MU-MIMO scheduling method according to the aspect of the present invention may be such that RBs are allocated to users without posing restriction on the order of allocating RBs on the frequency axis and the space axis, or may be such that all the RBs on the frequency axis are allocated to users for each space axis.

Further, the MU-MIMO scheduling method according to the aspect of the present invention may be such that the computation of a corrected SINR is performed by updating a projected channel vector of unselected users for the n-th user, computing an orthogonal coefficient of RBs in the next multiple MIMO layer based on the projected channel vector, and multiplying the reception SINR by the orthogonal coefficient to obtain the corrected SINR.

According to the MU-MIMO scheduling method as described above, RBs generated by frequency division within a system band are allocated to optimal users while considering reception qualities (SINRs) represented in two dimensions of the frequency axis and the space axis, whereby a significant multi-user diversity effect can be obtained and the cell throughput of a mobile communication system can be improved.

Further, this MU-MIMO scheduling method is a scheduling method based on SINRs corrected with a GS orthogonalization coefficient for each multiple MIMO layer. Therefore, the method can be implemented with a smaller amount of computation, and is applicable to scheduling methods using any desired priority function.

DESCRIPTION OF THE EXEMPLARY EMBODIMENTS

In uplink MU-MIMO communication employing an SC-FDMA or OFDMA method, a wireless resource is frequency-divided into I (I is an integer of one or more) RBs while, at the same time, it is space division multiplexed by M at the same frequency (RB) using MIMO. Therefore, I×M wireless resources are allocated to optimal users.

In an MU-MIMO scheduling method applied to the present invention, RBs generated by frequency division within a system band are allocated to optimal users while considering reception qualities (SINRs) represented in two dimensions of the frequency axis and the space axis at the same time.

Figure 7:
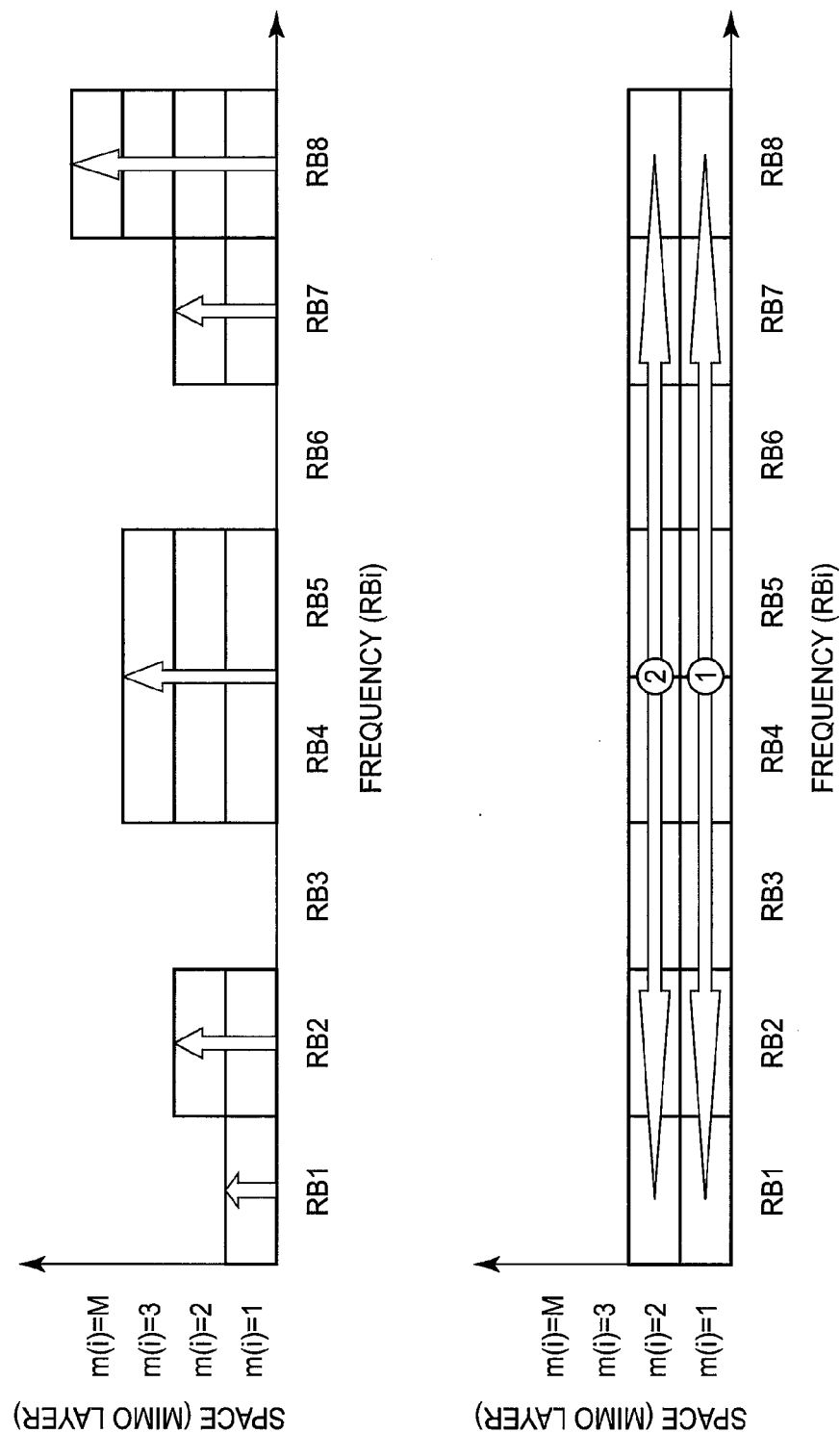
FIGS. 7A and 7B are diagrams for explaining outline of an MU-MIMO scheduling method according to the present invention.

FIGS. 7A and 7B shows an outline of two-dimensional scheduling methods. In two-dimensional scheduling, a higher degree of freedom in RB allocation and hence better characteristics can be expected as the number of allocatable RBs constantly existing in the course of scheduling is increased. The methods shown in FIGS. 7A and 7B are believed to be desirable in view of its high degree of freedom in RB allocation.

FIG. 7A is a method of allocating RBs to users without posing any restriction on the order of allocating the RBs on the frequency axis and the space axis. This method offers the highest degree of freedom in RB allocation. Specifically, a degree of freedom in RB allocation corresponding to I RBs is always ensured before M RBs are allocated along the space axis. In the example shown in FIG. 7A, allocation is not performed sequentially from RB1 along the frequency axis, but RBs are allocated to users by a method in which, after allocation of an arbitrary RB, an RB to be allocated subsequently is selected along the space axis.

FIG. 7B shows a method for allocating all the RBs on the frequency axis to users for each space axis. Since the degree of freedom in allocation is reduced when the number of unallocated RBs on the frequency axis on each space axis becomes smaller, this method may be inferior to the method shown in FIG. 7A in terms of characteristics. However, since the scheduling in the first multiple MIMO layer is the same as a general frequency scheduling, the method can be easily executed with the use of existing equipment only by enhancing the function thereof.

Figure 8:
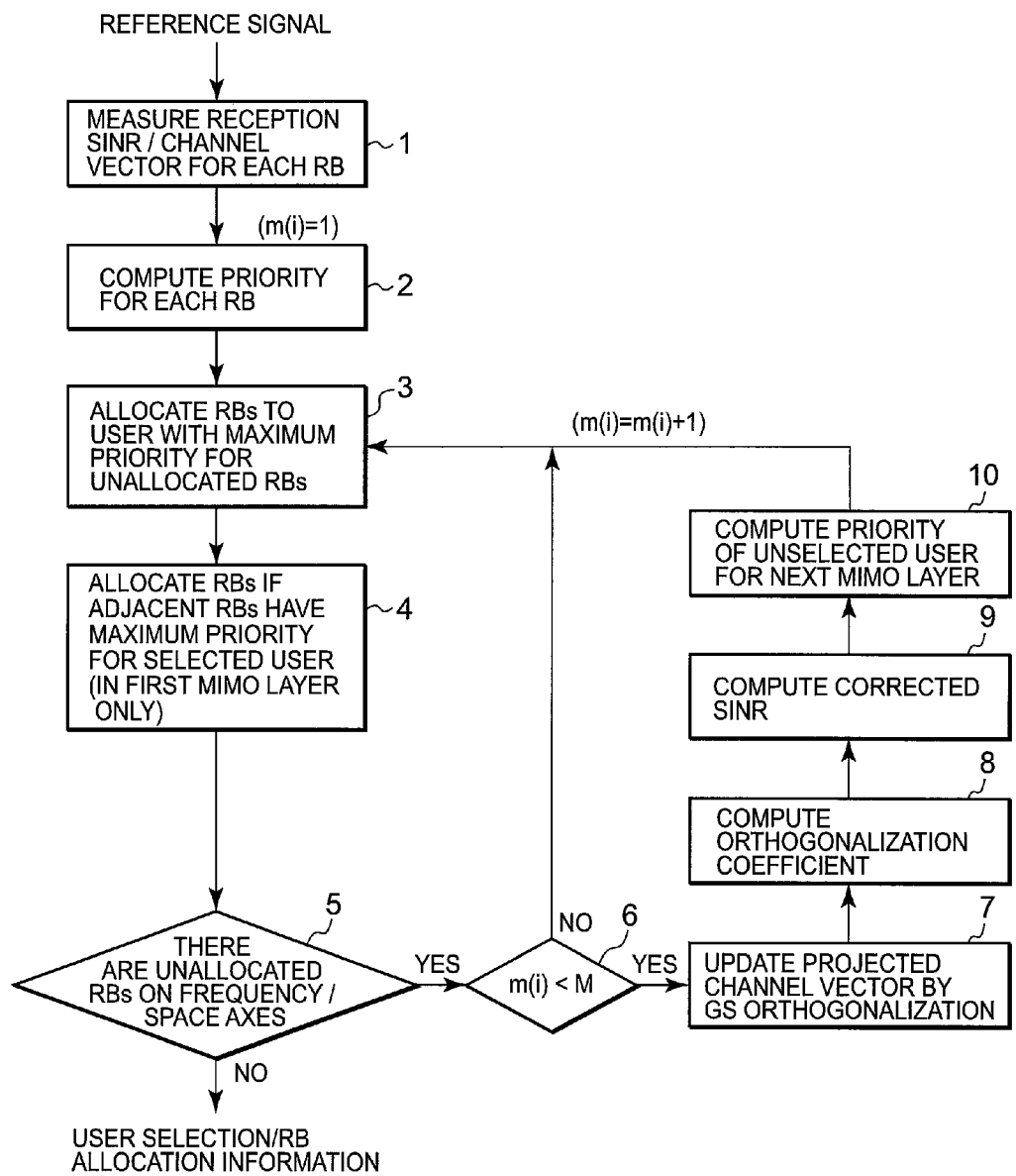
FIG. 8 is a diagram showing a first exemplary embodiment of the MU-MIMO scheduling method according to the present invention.

Referring to FIG. 8, an exemplary embodiment of the MU-MIMO scheduling method according to the present invention will be described. Detailed description of a hardware configuration for implementing the present invention will be omitted here since it can be embodied by using a general configuration of MU-MIMO. This means that any MU-MIMO communication system having a scheduler for allocating frequency- and space-divided resource blocks to a plurality of users is applicable to the scheduling method according to the present invention.

The first exemplary embodiment relates to a method of allocating RBs to users without posing any restriction on the order of allocating the RBs as shown in FIG. 7A. The scheduling method according to the first exemplary embodiment includes a reception SINR/channel vector measurement process 1 for each RB, a priority computation process 2 for each RB, a maximum priority user selection/RB allocation process 3, a plural RBs allocation process 4, a frequency/space axis unallocated RB presence determination process 5, a next MIMO layer priority computation execution determination process 6, a projected channel vector update process 7, an orthogonal coefficient computation process 8, a corrected SINR computation process 9, and a next MIMO layer priority computation process 10. The processes described above are implemented by software and/or hardware.

The reception SINR/channel vector measurement process 1 measures a reception SINR and channel vector for each uplink RB by using reference signals of users. The reference signal as used here is a sounding reference signal which is periodically transmitted principally when no data is transmitted. In a mobile communication system, a reception SINR is generally used as an indicator indicating a channel quality, that is, CQI. Therefore, CQI may be used as the reception SINR.

The priority computation process 2 computes priorities of the users for each RB by using the reception SINRs based on the CA or PF method.

The maximum priority user selection/RB allocation process 3 selects a user with the maximum priority for an unallocated RB and allocates the RB to the user.

If the user allocated with an RB by the maximum priority user selection/RB allocation process 3 still has maximum priority for any other RBs than the allocated one, the plural RBs allocation process 4 allocates those RBs to the user. In the SC-FDMA method which requires allocation of consecutive RBs, for example, if the user has maximum priority for RBs adjacent to the allocated RB, these RBs are allocated to the user.

The frequency/space axis unallocated RB presence determination process 5 proceeds to scheduling for a next user if there are any unallocated RBs on the frequency or space axis, whereas terminates the scheduling if there is no unallocated RB and outputs user selection and RB allocation information.

The next MIMO layer priority computation execution determination process 6 proceeds to a process of computing priorities for the next multiple MIMO layer if m(i)<M, whereas, if m(i)=M, proceeds to scheduling for a next user.

The projected channel vector update process 7 updates, by GS orthogonalization, a projected channel vector $h_j^{(m+1)}(k)$ of a subcarrier k ($1 \leq k \leq K$: K is an average number of subcarriers) of an unselected user which is projected on a complementary space $Q^{(m)\perp}$ of an orthonormal system $Q^{(m)}$ corresponding to the already selected user, the channel vector $h_j^{(m+1)}(k)$ being represented by the following expression (9).

$$h_j^{(m+1)}(k) = h_j^{(m)}(k) - \frac{\left(h_{J_m}^{(m)H}(k)h_j^{(m)}(k)\right)h_{J_m}^{(m)}(k)}{\|h_{J_m}^{(m)}(k)\|^2} \quad (9)$$

In the expression (9) above, $h_j^{(1)}(k)=h_j(k)$.

Although it is assumed that the projected channel vector update process 7 is performed basically for each subcarrier, it may be performed for each subcarrier group corresponding to a coherent bandwidth for the purpose of reducing the amount of computation.

The orthogonal coefficient computation process 8 computes an orthogonal coefficient $\rho_j^{(m+1)}$ ($0 \leq \rho_j^{(m+1)} \leq 1$) by averaging (or totalizing) powers of the projected channel vectors $h_j^{(m+1)}(k)$ of the subcarriers k of the users updated by GS orthogonalization over a predetermined frequency bandwidth (RB bandwidth, or bandwidth of a single carrier), and normalizing it with an averaged (or totalized) channel power in the bandwidth. The orthogonal coefficient $\rho_j^{(m+1)}$ of the (m+1)-th multiple MIMO layer for each user is represented by the following expression (10).

$$\rho_j^{(m+1)} = \frac{\frac{1}{K}\sum_{k=1}^{K}\|h_j^{(m+1)}(k)\|^2}{\frac{1}{K}\sum_{k=1}^{K}\|h_j(k)\|^2} \quad (10)$$

In the expression (10) above, $\rho_j^{(1)}=1$.

The corrected SINR computation process 9 computes a corrected SINR $\rho_j^{(m+1)}SINR_j$ by multiplying a reception SINR $SINR_j$ of each user by an orthogonal coefficient $\rho_j^{(m+1)}$.

The next MIMO layer priority computation process 10 computes a priority of an unselected user for a corresponding carrier (RBs) in the next multiple MIMO layer based on the corrected SINR. According to the CA method, the corrected SINR $\rho_j^{(m+1)}SINR_j$ itself represents the priority. On the other hand, according to the PF method, a support data rate $R_j(\rho_j^{(m+1)}SINR_j)$ is computed from the corrected SINR $\rho_j^{(m+1)}SINR_j$, and a value $R_j(\rho_j^{(m+1)}SINR_j)/R^-_j$ obtained by weighting the same with an inverse number of an average support data rate $R^-_j$ represents the priority.

This can be applied to a scheduling method taking into consideration the priority of a factor other than the channel quality, such as a request for delay or a request for retransmission, by performing scheduling with the use of a comprehensive priority obtained by adding a priority of a factor other than the channel quality to the priority represented by a function of corrected SINR.

The priority of the unselected user computed by the next MIMO layer priority computation process 10 is supplied to the maximum priority user selection/RB allocation process 3, in which scheduling is performed for the next user. The computation of the priority of a request for delay may be performed, for example, by monitoring the amount of delay in each packet so that the priority is increased when the amount of delay is increased. The computation of the priority of a request for retransmission may be performed, for example, by monitoring the number of retransmissions in each packet so that the priority is increased when the number of retransmissions is increased. Further, other methods may be used to compute the priority of a request for delay or request for retransmission.

Figure 9:
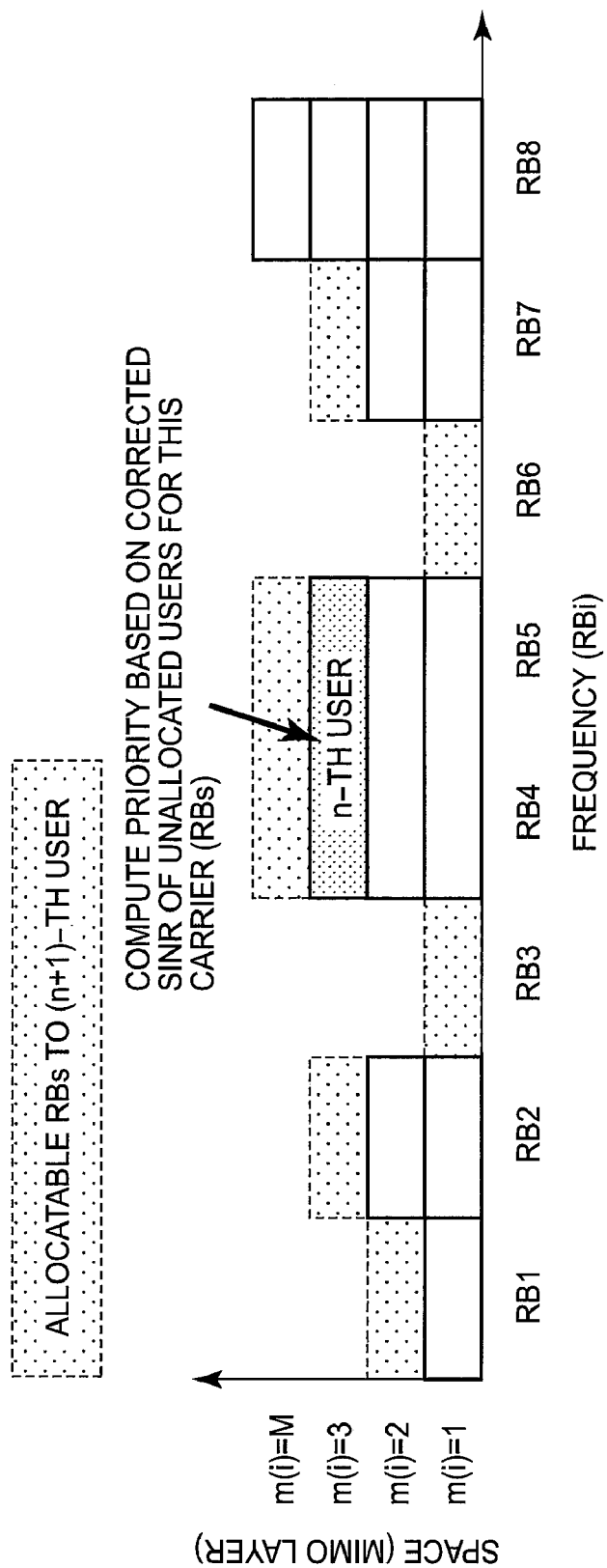
FIG. 9 is a diagram showing how RBs are allocated in the MU-MIMO scheduling method according to the first exemplary embodiment.

FIG. 9 shows how RBs are allocated according to the first exemplary embodiment of the invention. The shown embodiment relates to a method for allocating RBs to users without posing restriction on the order of allocating RBs on the frequency axis and the space axis. For example, when a carrier consisting of RB4 and RB5 in the third multiple MIMO layer is allocated to an n-th user, priorities of unselected users for a carrier consisting of RB4 and RB5 in the fourth multiple MIMO layer are computed, so that RBs are allocated to the user having the maximum priority for the unallocated RBs indicated by the half-tone dot meshing including that carrier, as the (n+1)-th user.

Figure 10:
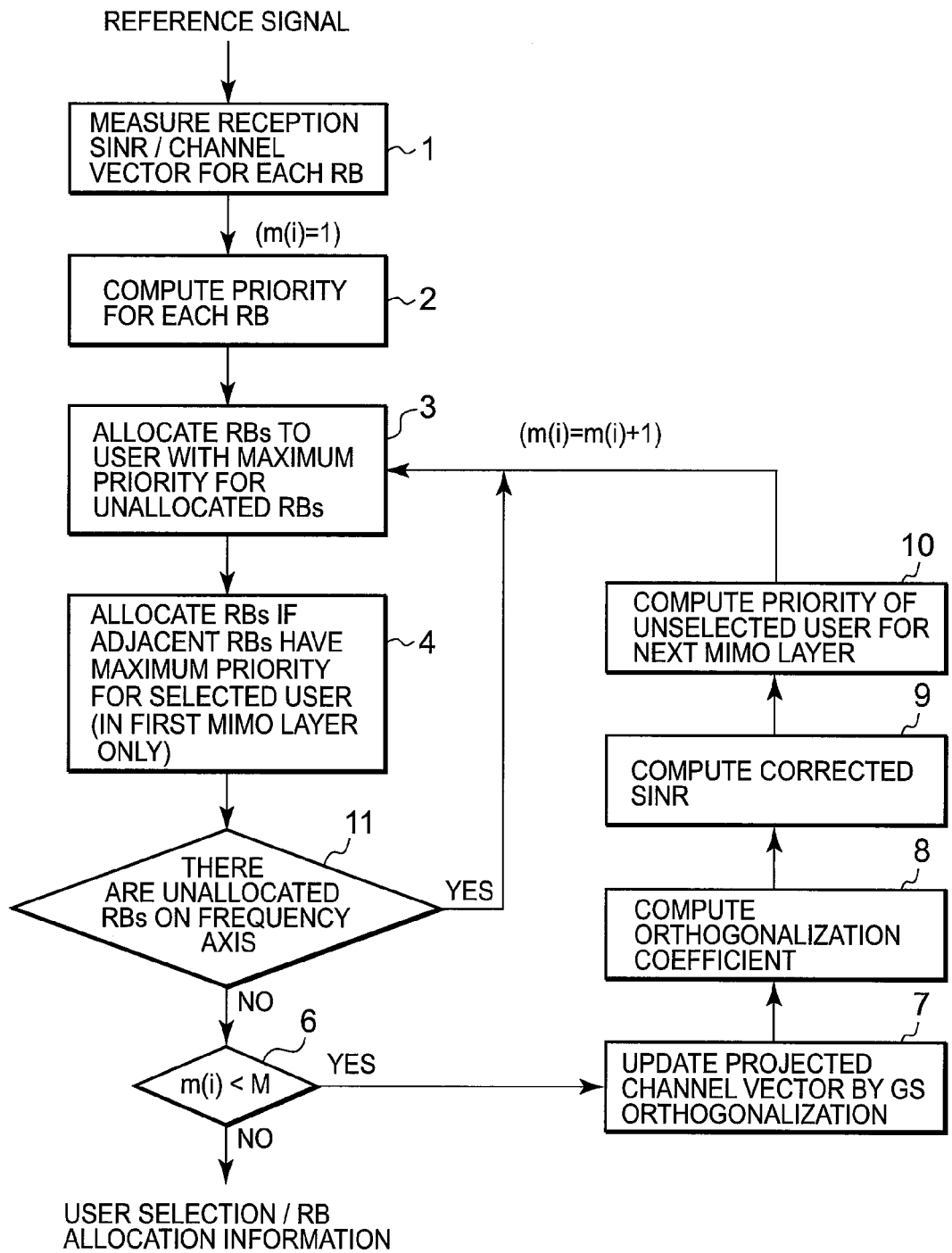
FIG. 10 is a diagram showing a second exemplary embodiment of an MU-MIMO scheduling method according to the present invention.

Referring to FIG. 10, a second exemplary embodiment of an MU-MIMO scheduling method according to the present invention will be described. The shown exemplary embodiment relates to the method described in FIG. 7B.

The scheduling method according to this exemplary embodiment includes a reception SINR/channel vector measurement process 1 for each RB, a priority computation process 2 for each RB, a maximum priority user selection/RB allocation process 3, a plural RBs allocation process 4, a frequency axis unallocated RB presence determination process 11, a next MIMO layer priority computation execution determination process 6, a projected channel vector update process 7, an orthogonal coefficient computation process 8, a corrected SINR computation process 9, and a next MIMO layer priority computation process 10.

The reception SINR/channel vector measurement process 1 measures a reception SINR and channel vector for each uplink RB by using reference signals of users. The priority computation process 2 computes priorities of the users for each RB by using the reception SINR based on the CA or PF method. The maximum priority user selection/RB allocation process 3 selects a user with the maximum priority for an unallocated RB and allocates the RB to the user. If the user allocated with the RB by the maximum priority user selection/RB allocation process 3 still has the maximum priority for any other RBs than the allocated RB, the plural RBs allocation process 4 allocates those RBs to the user. In the SC-FDMA method which requires allocation of consecutive RBs, for example, if the selected user has the maximum priority for RBs adjacent to the allocated RB, these RBs are allocated to the user.

The frequency axis unallocated RB presence determination process 11 proceeds to scheduling of the next user if there is any unallocated RBs on the frequency axis, whereas proceeds to the process of computing priorities for the next multiple MIMO layer if there is no unallocated RB. The next MIMO layer priority computation execution determination process 6 proceeds to computation of a priority of the next multiple MIMO layer if m(i)<M, whereas if m(i)=M, terminates the scheduling and outputs user selection and RB allocation information.

The projected channel vector update process 7 updates, by GS orthogonalization, a projected channel vector $h_j^{(m+1)}(k)$ of a subcarrier k of an unselected user which is projected on a complementary space $Q^{(m)\perp}$ of an orthonormal system $Q^{(m)}$ corresponding to the already selected user, the projected channel vector $h_j^{(m+1)}(k)$ being represented by the expression (9) above. The orthogonal coefficient computation process 8 computes, according to the expression (10) above, an orthogonal coefficient $\rho_j^{(m+1)}$ by averaging (or totalizing) powers of the projected channel vectors $h_j^{(m+1)}(k)$ of the subcarriers k of the users updated by GS orthogonalization over a predetermined frequency bandwidth (RB bandwidth, or bandwidth of a single carrier), and normalizing it with an averaged (or totalized) channel power in the same bandwidth.

The corrected SINR computation process 9 computes a corrected SINR $\rho_j^{(m+1)}SINR_j$ by multiplying a reception SINR $SINR_j$ of each user by the orthogonal coefficient $\rho_j^{(m+1)}$. The next MIMO layer priority computation process 10 computes a priority of an unselected user for a corresponding carrier (RBs) in the next multiple MIMO layer based on the corrected SINR. The priority of the unselected user computed by the next MIMO layer priority computation process is supplied to the maximum priority user selection/RB allocation process 3 so that scheduling of the next user is performed.

Figure 11:
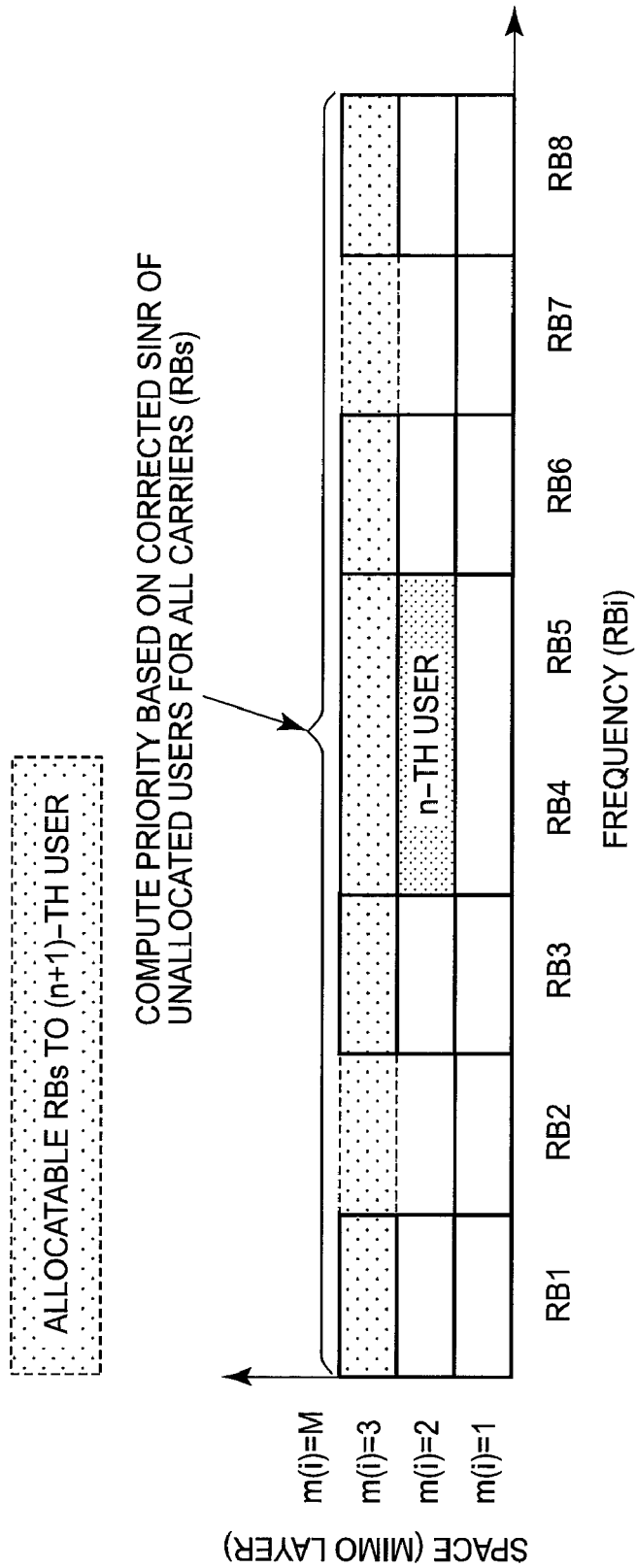
FIG. 11 is a diagram showing how RBs are allocated in the MU-MIMO scheduling method according to the second exemplary embodiment.

FIG. 11 shows how RBs are allocated according to the exemplary embodiment. The exemplary embodiment relates to a method for allocating all the RBs on the frequency axis to users for each space axis. For example, when a carrier consisting of RB4 and RB5 in the second multiple MIMO layer is allocated to the n-th user as the final RBs, priorities of unselected users for all the carriers (RBs) in the third multiple MIMO layer are computed so that RBs are allocated to the user having the maximum priority for the unallocated RBs indicated by the half-tone dot meshing, as the (n+1)-th user.

According to the exemplary embodiments shown in FIGS. 8 and 10, MIMO signal separation processing at the base station (receiver or reception device) is performed for each user in a simple way. Therefore, it is assumed that the RB allocation bands (RB allocation patterns) to the users in the second and onward multiple MIMO layers are the same as the allocated band in the first multiple MIMO layer. However, the present invention is not limited to this, but may be implemented by a method in which RBs in an arbitrary band and pattern are allocated to the users among multiple MIMO layers, or by a method in which RBs in different multiple MIMO layers are allocated to the same user. These methods are also embraced by the present invention.

It is assumed in the embodiment shown in FIGS. 8 and 10 that the GS orthogonalization processing is performed on all the unselected users of $N_u$ users. However, the present invention may be embodied by a method in which users are narrowed down to those with high priority when selecting users in the first multiple MIMO layer, and only those users are considered when selecting users for the second and onward multiple MIMO layers. This method significantly reduces the amount of computation, because when considering a certain number (e.g. about 16) of users with high priority, users having a high orthogonality will be included in these users, and the chance will be low that users with low priority for the first multiple MIMO layer are selected for the second and onward multiple MIMO layers due to the effect of channel orthogonality.

Although the description of the embodiment shown in FIGS. 8 and 10 has been made in terms of an uplink MU-MIMO scheduling method, the scheduling method of the invention is also applicable to a downlink MU-MIMO scheduling method.

As described above, the MU-MIMO scheduling method of the present invention allocates RBs generated by frequency division within a system band while considering reception qualities (SINRs) represented in two dimensions of the frequency axis and the space axis at the same time, whereby a significant multi-user diversity effect is obtained and thus the cell throughput of the mobile communication system can be improved.

Further, the MU-MIMO scheduling method of the present invention, which is a scheduling method based on SINRs corrected with a GS orthogonalization coefficient for each multiple MIMO layer, can be executed by a small amount of computations and is applicable to scheduling methods using any desired priority function.

Figure 1:
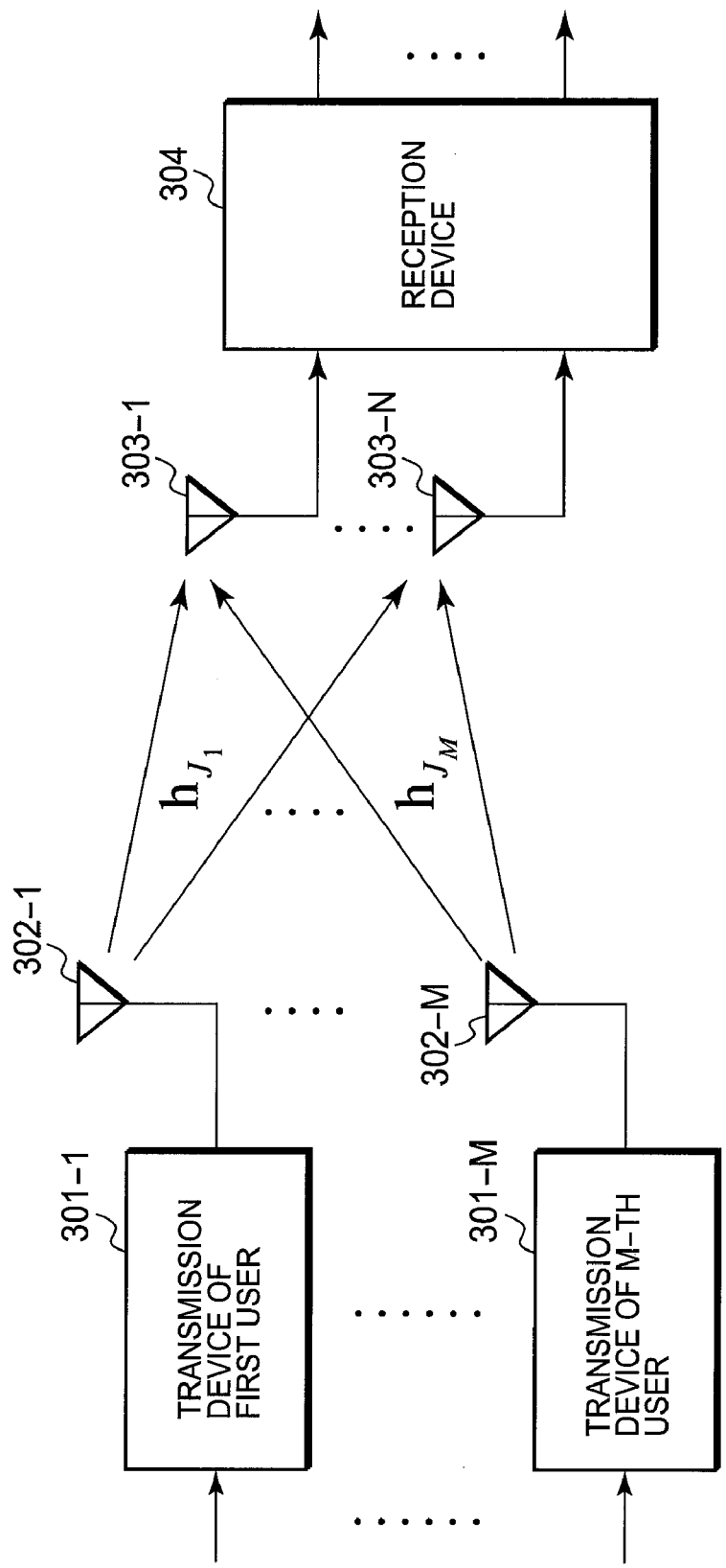
FIG. 1 is a diagram showing a configuration example of an uplink MU-MIMO communication system of related art.
Figure 2:
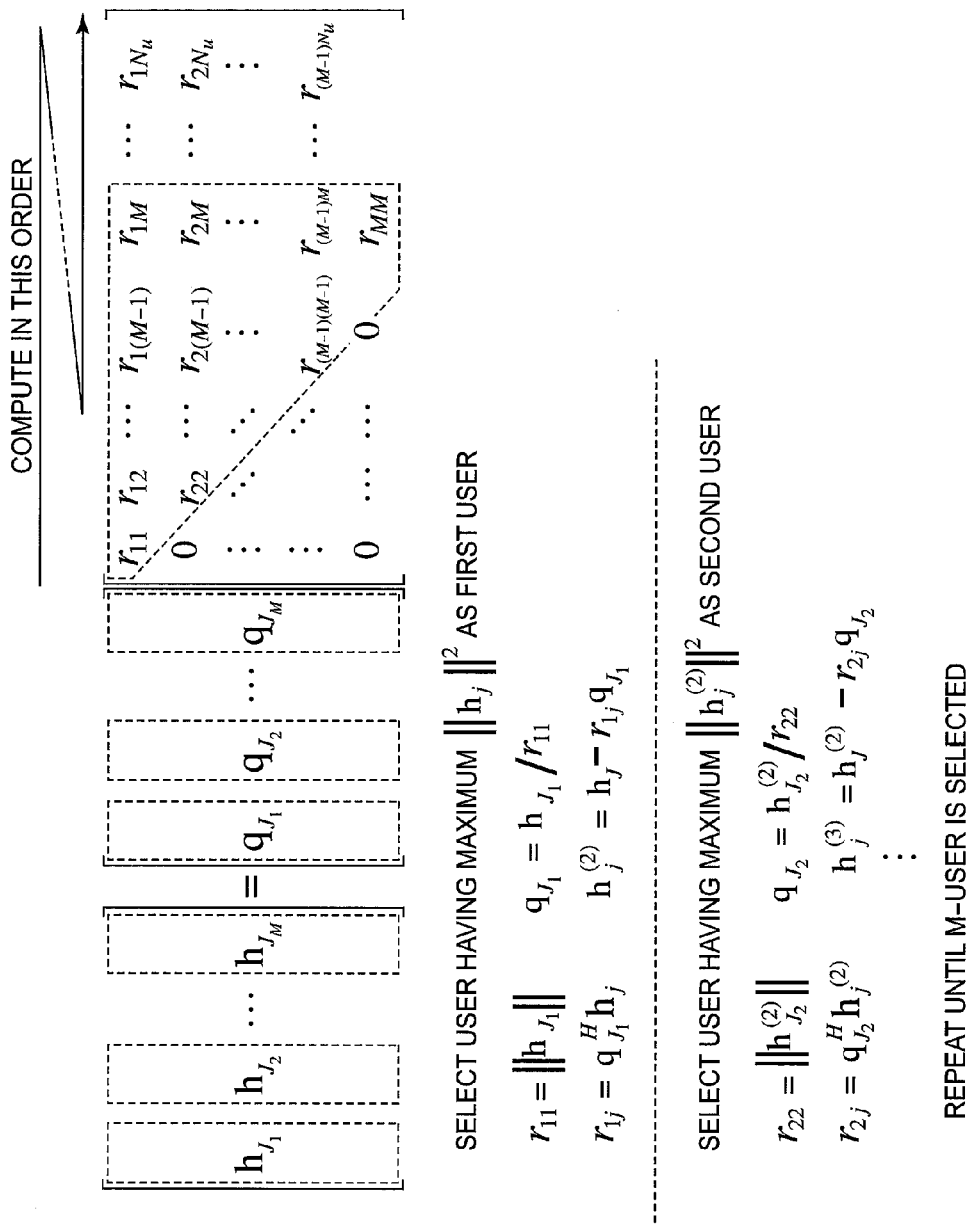
FIG. 2 is a diagram for explaining relationship between GS orthogonalization and QR decomposition.
Figure 3:
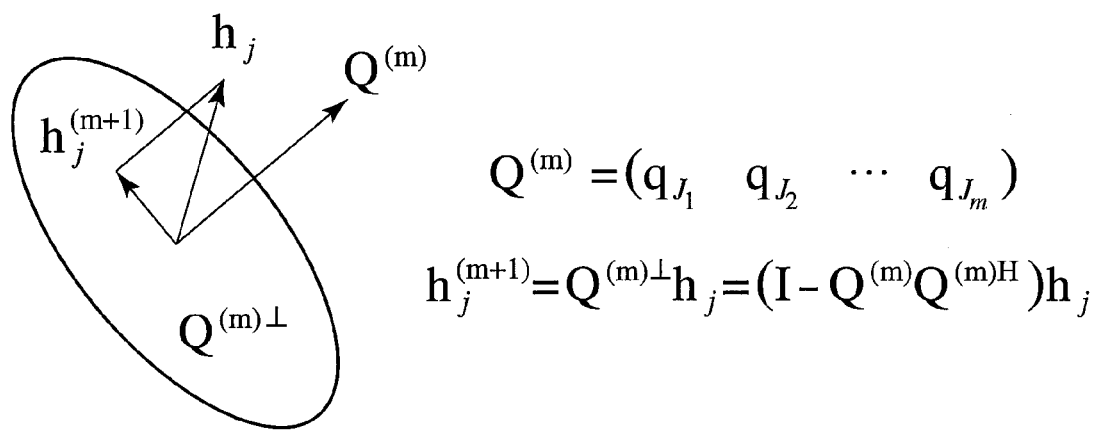
FIG. 3 is a diagram showing a concept of GS orthogonalization.
Figure 4:
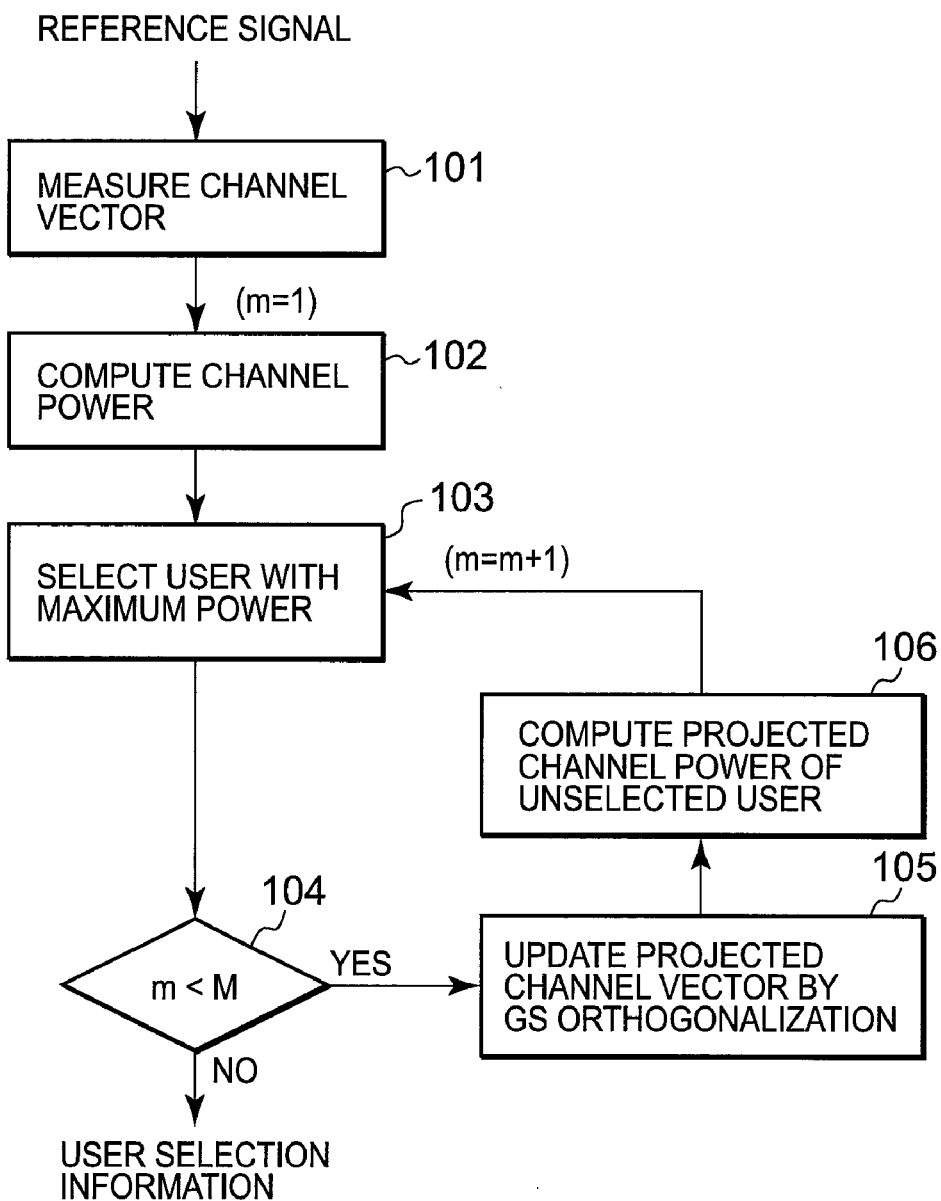
FIG. 4 is a flowchart for explaining a general example of an MU-MIMO scheduling method.
Figure 5:
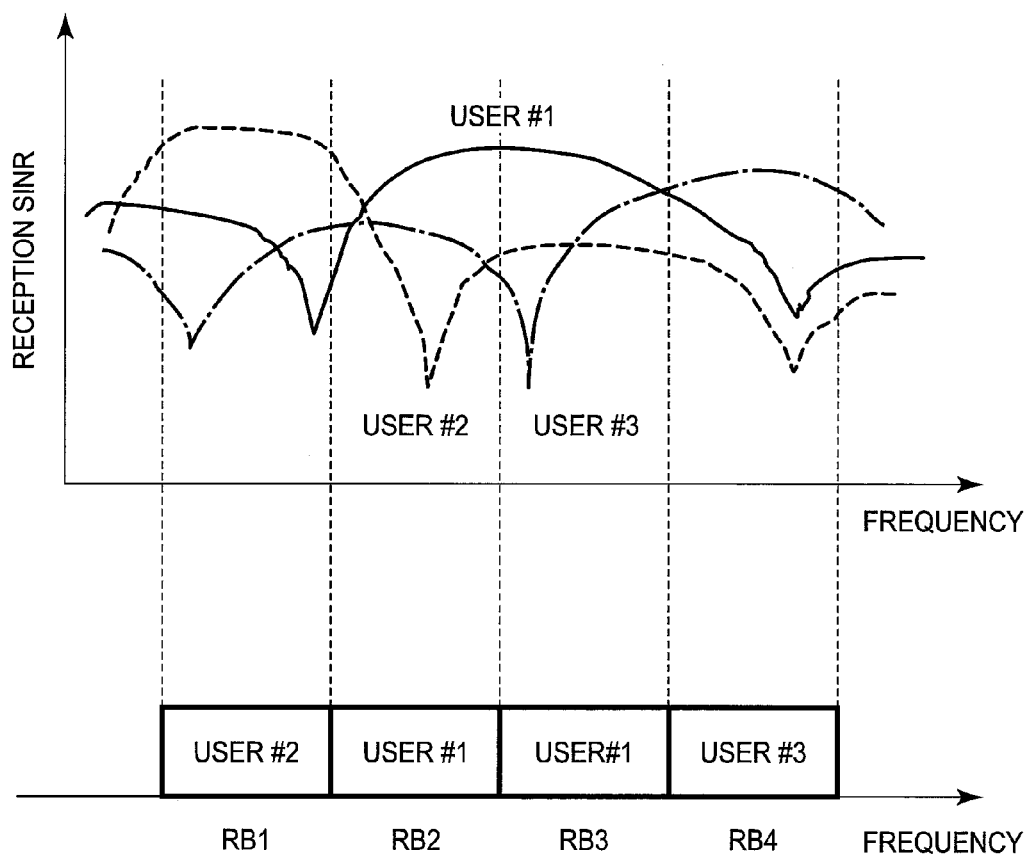
FIG. 5 is a diagram showing a frequency scheduling method employing a general maximum CIR method.
Figure 6:
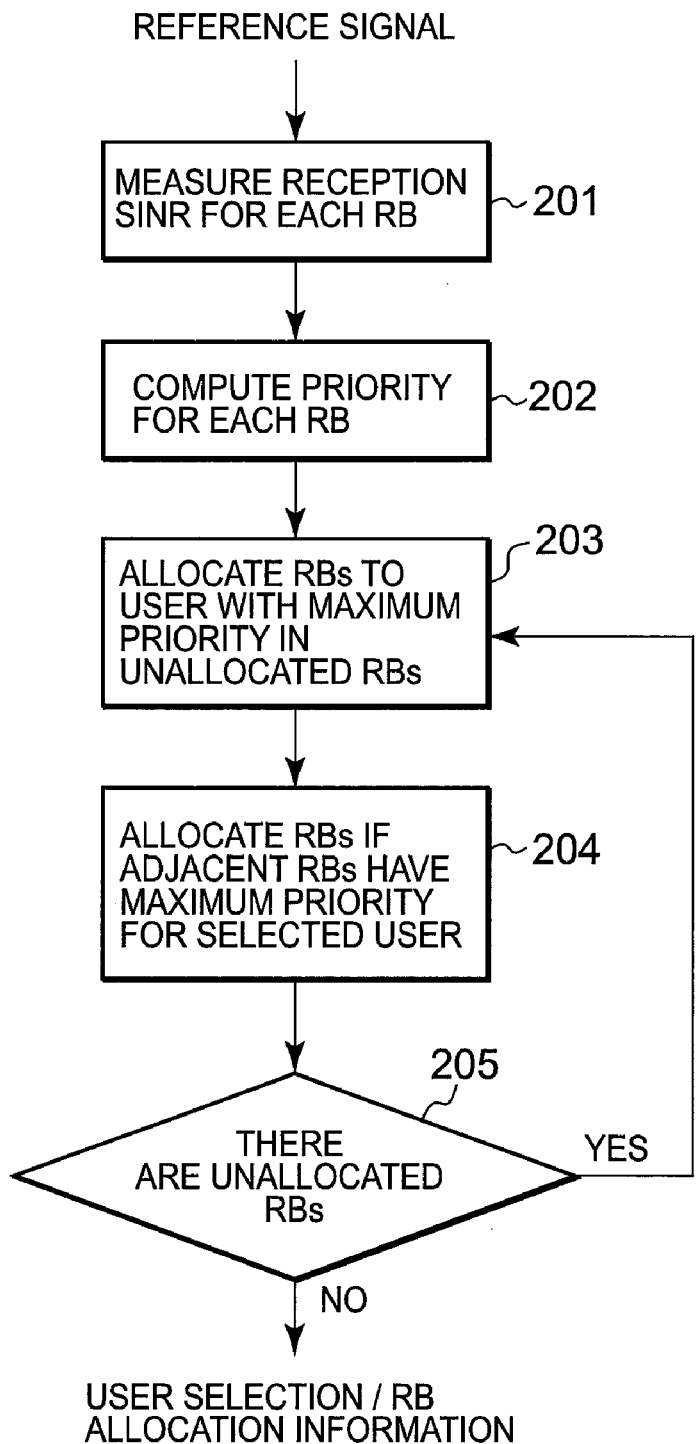
FIG. 6 is a flowchart for explaining a general frequency scheduling method.

The present invention is applicable at least to an MU-MIMO communication system having a configuration as shown in FIG. 1. Specifically, the scheduling method of the present invention is implemented by an operating program introduced in a scheduler provided in a base station (reception device). In this case, the scheduler has a storage device for storing the program and a computer or CPU (Central Processing Unit) for retrieving the program from the storage device and executing the same.

According to the present invention, the amount of computation of a reception device (base station) is reduced more remarkably as the number of transmission devices communicating simultaneously is increased.

Although this invention has been described in conjunction with a few exemplary embodiments thereof, this invention is not limited to the foregoing exemplary embodiments but may be modified in various other manners within the scope of the appended claims.

What is claimed is:

1. An MU-MIMO scheduling method for allocating frequency- and space-divided resource blocks to users, comprising:
    allocating one or more resource blocks to a user with a maximum priority by determining the maximum priority used in allocation of resource blocks to users such that a priority based on reception Signal to Interference and Noise power Ratios for each resource block is used for a first multiple MIMO layer, and a priority based on corrected Signal to Interference and Noise power Ratios is used for the second and onward multiple MIMO layers;
    computing a corrected Signal to Interference and Noise power Ratio of an unselected user for resource blocks in the multiple MIMO layer next to that of the allocated resource blocks;
    computing a priority represented by a function of the corrected Signal to Interference and Noise power Ratio; and
    allocating resource blocks to a next user by using priorities for unallocated resource blocks including the resource blocks for which the priority has been computed.

2. The MU-MIMO scheduling method as claimed in claim 1, wherein a Channel Quality Indicator is used as the reception Signal to Interference and Noise power Ratio.

3. The MU-MIMO scheduling method as claimed in claim 1, wherein resource blocks are allocated to users without posing any restriction on the order of allocation of resource blocks on the frequency axis and the space axis.

4. The MU-MIMO scheduling method as claimed in claim 1, wherein all the resource blocks on the frequency axis are allocated to users for each space axis.

5. The MU-MIMO scheduling method as claimed in claim 1, wherein the computation of the corrected Signal to Interference and Noise power Ratio is performed by updating a projected channel vector of an unselected user for an n-th user, computing an orthogonal coefficient of resource blocks of the next multiple MIMO layer based on the projected channel vector, and multiplying the reception Signal to Interference and Noise power Ratio by the orthogonal coefficient.

6. The MU-MIMO scheduling method as claimed in claim 5, wherein the update of the projected channel vector is performed by updating a projected channel vector on a complementary space of an orthonormal system corresponding to a user already selected by GS orthogonalization, for each predetermined frequency resolution.

7. The MU-MIMO scheduling method as claimed in claim 6, wherein the predetermined frequency resolution is of a subcarrier or a subcarrier group corresponding to a coherent bandwidth.

8. The MU-MIMO scheduling method as claimed in claim 5, wherein the update of the projected channel vector is performed by a method in which, when a projected channel vector of a subcarrier k of a user j in the m-th multiple MIMO layer is represented by hj(m)(k), where $1 \leq k \leq K$, $1 \leq j \leq Nu$, K is an average number of subcarriers, and Nu is a number of users, and a selected user in the m-th multiple MIMO layer is represented by Jm, a projected channel vector of the subcarrier k in the (m+1)-th multiple MIMO layer is updated so as to satisfy the following expression:

$$h_j^{(m+1)}(k) = h_j^{(m)}(k) - \frac{\left(h_{J_m}^{(m)H}(k) h_j^{(m)}(k)\right) h_{J_m}^{(m)}(k)}{\|h_{J_m}^{(m)}(k)\|^2}.$$

9. The MU-MIMO scheduling method as claimed in claim 5, wherein the computation of the orthogonal coefficient is performed by a method in which power of the projected channel vector of unselected users is averaged or totalized over a predetermined frequency bandwidth, and is normalized with an averaged or totalized channel power over the same bandwidth.

10. The MU-MIMO scheduling method as claimed in claim 9, wherein the predetermined frequency bandwidth is a bandwidth of a resource block or of a single carrier.

11. The MU-MIMO scheduling method as claimed in claim 5, wherein the computation of orthogonal coefficient is performed by a method in which, when a projected channel vector of a subcarrier k of a user j in the (m+1)-th multiple MIMO layer is represented by hj(m+1)(k), and a channel vector of the subcarrier k of the user j is represented by hj(k), an orthogonal coefficient ρj(m+1) ($0 \leq \rho_j(m+1) \leq 1$) of the user j in the (m+1)-th multiple MIMO layer is computed so as to satisfy the following expression:

$$\rho_j^{(m+1)} = \frac{\frac{1}{K}\sum_{k=1}^{K} \|h_j^{(m+1)}(k)\|^2}{\frac{1}{K}\sum_{k=1}^{K} \|h_j(k)\|^2}.$$

12. The MU-MIMO scheduling method as claimed in claim 1, wherein the computation of priority is performed by using a corrected Signal to Interference and Noise power Ratio as a priority.

13. The MU-MIMO scheduling method as claimed in claim 1, wherein the computation of priority is performed by computing a support data rate based on a corrected Signal to Interference and Noise power Ratio, and using the support data rate weighted with an inverse of an average support data rate as the priority.

14. The MU-MIMO scheduling method as claimed in claim 1, wherein the computation of priority is performed by computing a comprehensive priority by adding a priority of a request for delay or a request for retransmission to a priority represented by a function of the corrected Signal to Interference and Noise power Ratio.

15. The MU-MIMO scheduling method as claimed in claim 1, wherein users are narrowed down to those with high priority when selecting users for the first multiple MIMO layer, and users are selected from only those users for the second and onward multiple MIMO layers.

16. A scheduling method for use in an MU-MIMO communication system allocating frequency- and space-divided carriers to users, the method being for performing scheduling for allocating carriers to users and comprising:
   computing a priority of each user for each carrier based on a reception Signal to Interference and Noise power Ratio of each of resource blocks forming a carrier;
   selecting a user with a maximum priority for an unallocated carrier;
   allocating the unallocated carrier to the user with the maximum priority;
   updating a projected channel vector of a carrier of an unselected user by GS orthogonalization to obtain an orthogonal coefficient if there is an unallocated carrier in the space axis direction, and computing a corrected Signal to Interference and Noise power Ratio by multiplying the reception Signal to Interference and Noise power Ratio of the unselected user by the orthogonal coefficient;
   computing a priority of the unselected user of the carrier based on the computed corrected Signal to Interference and Noise power Ratio; and
   allocating the unselected user with the maximum priority to the unallocated carrier in the space axis direction.

17. A scheduling method for use in an MU-MIMO communication system allocating frequency- and space-divided carriers to users, the method being for performing scheduling for allocating carriers to users and comprising:
   computing a priority of each user for each carrier based on a reception Signal to Interference and Noise power Ratio of each of resource blocks forming a carrier;
   selecting a user with a maximum priority for an unallocated carrier;
   allocating the unallocated carrier to the user with the maximum priority;
   updating a projected channel vector of a carrier of an unselected user by GS orthogonalization to obtain an orthogonal coefficient if there is an allowable next multiple MIMO layer in the space axis direction and there is no unallocated carrier on the frequency axis, and computing a corrected Signal to Interference and Noise power Ratio by multiplying the reception Signal to Interference and Noise power Ratio of the unselected user by the orthogonal coefficient;
   computing a priority of the unselected user for the carrier based on the computed corrected Signal to Interference and Noise power Ratio; and
   allocating the unselected user with the maximum priority to the unallocated carrier in the next multiple MIMO layer.

18. The scheduling method as claimed in claim 16, wherein each carrier allocated to the users is composed of a single resource block or an allowable number of resource blocks in the frequency axis direction.

19. A non-transitory program product storing a program that when executed by a base station causes the base station to implement an operation for allocating frequency- and space-divided resource blocks or carriers to mobile stations or transmission devices by using a MU-MIMO scheduling method comprising:
   allocating one or more resource blocks to a user with a maximum priority by determining the maximum priority used in allocation of resource blocks to users such that a priority based on reception Signal to Interference and Noise power Ratios for each resource block is used for a first multiple MIMO layer, and a priority based on corrected Signal to Interference and Noise power Ratios is used for the second and onward multiple MIMO layers;
   computing a corrected Signal to Interference and Noise power Ratio of an unselected user for resource blocks in the multiple MIMO layer next to that of the allocated resource blocks;
   computing a priority represented by a function of the corrected Signal to Interference and Noise power Ratio; and
   allocating resource blocks to a next user by using priorities for unallocated resource blocks including the resource blocks for which the priority has been computed.

* * * * *